(12) United States Patent
Szubbocsev

(10) Patent No.: US 11,656,631 B2
(45) Date of Patent: *May 23, 2023

(54) REPURPOSING AUTONOMOUS VEHICLES FOR PACKAGE DELIVERY

(71) Applicant: Micron Technology, Inc., Boise, ID (US)

(72) Inventor: Zoltan Szubbocsev, Haimhausen (DE)

(73) Assignee: Micron Technology, Inc., Boise, ID (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/113,775

(22) Filed: Dec. 7, 2020

(65) Prior Publication Data

US 2021/0116936 A1    Apr. 22, 2021

Related U.S. Application Data

(63) Continuation of application No. 15/893,036, filed on Feb. 9, 2018, now Pat. No. 10,860,036.

(51) Int. Cl.
*G05D 1/02* (2020.01)
*G05D 1/00* (2006.01)
(Continued)

(52) U.S. Cl.
CPC .......... *G05D 1/0291* (2013.01); *G05D 1/0088* (2013.01); *G05D 1/0225* (2013.01);
(Continued)

(58) Field of Classification Search
CPC ........ B64C 2201/024; B64C 2201/042; B64C 2201/066; B64C 39/024; B64F 1/00; B64D 35/02; G06Q 10/08355; G01C 21/00; G01C 21/12; G01C 21/34; G08G 7/00; G08G 1/00; G08G 1/01; G08G 1/017; G08G 1/161; G08G 1/164; G08G 1/20; G08G 1/202; G08G 1/205; G08G 5/00; G08G 5/0004; G08G 5/0013; G08G 5/003; G08G 5/0034; G08G 5/0043; G08G 5/02; G08G 5/06; G08G 5/0607; G08G 3/00; B60P 1/00; B60P 3/00; B60P 3/06; B60P 3/1008; B60P 3/11; B60P 1/02; B60P 1/43;
(Continued)

(56) References Cited

U.S. PATENT DOCUMENTS 7,624,024 B2    11/2009 Levis et al.
9,561,852 B1    2/2017 Beaman et al.
(Continued)

*Primary Examiner* — Anthony R Jimenez
(74) *Attorney, Agent, or Firm* — Greenberg Traurig

(57) ABSTRACT

Systems and methods for re-purposing autonomous vehicle for package transportation are disclosed. In one embodiment, a method is disclosed comprising receiving a request from an autonomous vehicle; identifying, responsive to the request, a nearby package stored within a delivery structure; transmitting routing instructions to the autonomous vehicle, the routing instructions including a location of the delivery structure; detecting a presence of the autonomous vehicle; instructing the delivery structure to deposit the nearby package into the autonomous vehicle; calculating a waypoint for delivery of the nearby package; and transmitting transport routing instructions to the autonomous vehicle, the transport routing instructions including the waypoint.

20 Claims, 9 Drawing Sheets

(51) Int. Cl.
*G06Q 10/08* (2023.01)
*G06Q 10/0835* (2023.01)

(52) U.S. Cl.
CPC ..... *G05D 1/0285* (2013.01); *G06Q 10/08355* (2013.01); *G05D 2201/0216* (2013.01)

(58) Field of Classification Search
CPC ........ B60P 1/4471; B60P 1/5442; G05D 1/00; G05D 1/0027; G05D 1/0291; G05D 1/0088; G05D 1/02; G05D 1/0225; G05D 1/0285; G05D 1/0094; G05D 1/0268; G05D 1/0274; G05D 1/0276; G05D 1/0278; G05D 1/08; G05D 1/10; G05D 1/101; G05D 1/104; G05D 1/12; G05D 2201/02; G05D 2201/0211; G05D 2201/0216
USPC .......................................................... 701/23
See application file for complete search history.

(56) References Cited

U.S. PATENT DOCUMENTS

| | | |
|---|---|---|
| 10,241,516 B1 | 3/2019 | Brady et al. |
| 10,860,036 B2 | 12/2020 | Szubbocsev |
| 2015/0332206 A1* | 11/2015 | Trew .................. G06Q 10/0836 705/330 |
| 2017/0313421 A1 | 11/2017 | Gil |
| 2018/0105289 A1 | 4/2018 | Walsh et al. |
| 2019/0250636 A1 | 8/2019 | Szubbocsev |

* cited by examiner

REPURPOSING AUTONOMOUS VEHICLES FOR PACKAGE DELIVERY

RELATED APPLICATIONS

The present application is a continuation application of U.S. patent application Ser. No. 15/893,036, filed Feb. 8, 2018, issued as U.S. Pat. No. 10,860,036 on Dec. 8, 2020, entitled "REPURPOSING AUTONOMOUS VEHICLES FOR PACKAGE DELIVERY," the disclosure of which application is hereby incorporated by reference herein in its entirety.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The present disclosure relates to the field of autonomous vehicles and, specifically, to systems and methods for repurposing autonomous vehicles for performing synchronized package delivery and optimizing routing of autonomous vehicles to facilitate a fleet-based package delivery mechanism.

Currently, the technology supporting autonomous vehicles continues to improve. Improvements in digital camera technology, light detection and ranging (Lidar), and technologies have enabled vehicles to navigate roadways independent of drivers or with limited assistance from drivers. In some environments, such as factories, autonomous vehicles operate without any human intervention whatsoever.

While autonomous technology is primarily focused on control the movement of vehicles in a traditional sense, little emphasis has been placed on alternative applications that may be implemented on top of these autonomous systems. Indeed, application-level systems tend to reinforce existing uses of autonomous systems. For example, experimental uses of autonomous technology have been utilized to perform functions such as returning vehicles to a known location after delivering a passenger or performing refueling of vehicles while not utilized by passengers.

Simultaneously, the number of packages delivered to consumers and businesses continues to increase, especially given the increasing amount of e-commerce being performed. Despite this rapid increase, methods and systems for delivering packages are conceptually unchanged since the dawn of vehicle-based delivery. Certainly, many improvements have been made in optimizing logistics and scheduling, yet no fundamental changes in the way packages are delivered (e.g., by drivers employed delivery companies, by aircraft operated by delivery companies) have been adequately implemented and deployed.

Approaches to change the method of delivery of packages focuses on potentially problematic technology. For example, one proposed solution involves the use of small flying drones to deliver packages. This approach, however, suffers from numerous deficiencies such as regulatory hurdles, the potential for human injury, and the limited service area (e.g., limitations on flying in urban areas). To date, no viable solutions have been proposed to leverage the rise in autonomous vehicle technology to aid package delivery.

Thus, there exists a need to improve existing systems and methods of package delivery using autonomous vehicles.

BRIEF SUMMARY

The disclosed embodiments solve the above-identified problems by leveraging autonomous vehicles operating throughout a geographic region. Specifically, the disclosed embodiments describe systems and methods for repurposing autonomous vehicles to perform package delivery with minimal to no disruption of autonomous vehicle operations.

In one embodiment, the internal electronics of an autonomous vehicle may be unchanged, allowing the system to leverage existing autonomous vehicles. However, each autonomous vehicle may be equipped with software to manage the vehicle while in communication with a central server that manages the fleet. The software allows an occupant of an autonomous vehicle (e.g., an owner, a passenger, etc.) to enable or disable repurposing as well as define parameters of the repurposing.

In one embodiment, packages handled by the system are secured in bomb-proof and chemical-proof packaging to ensure safety. In other embodiments, the autonomous vehicles include a secure bomb-proof and chemical-proof storage receptacle (e.g., a trunk).

To support the system, the disclosed embodiments describe various architectural systems and devices. First, the disclosed embodiments describe centralized delivery locations. These centralized locations facilitate package deposits into autonomous vehicles. In some embodiments, these locations may be drive-thru locations and may be fully robotic. In general, an autonomous vehicle may be routed to a centralized location, the autonomous vehicle software may enable the opening of a delivery receptacle (e.g., a trunk or dedicated storage location), and a robotic delivery mechanism may insert one or more packages and secure the receptacle. The autonomous vehicle then continues operation until reaching a next centralized location. The centralized location then executes the above operations in reverse, facilitating delivery to the new location.

Second, the system can deploy one or more smaller pickup devices. In this embodiment, the pickup device may be position along a roadway. In one embodiment, the pickup devices may include a slot or opening where senders may insert packages. In one embodiment, the pickup devices automatically scan an identifier (e.g., a QR code or similar identifier) to detect and plan a route for the package. This identifier may be generated by the sender prior to deposit or may be created while depositing (e.g., via a kiosk-based user interface). In some embodiments, the pickup device may include bomb and chemical sensors to ensure that the deposited packages are safe for transit. In some embodiments, the pickup devices may further include x-ray scanners and utilize machine learning algorithms to classify items in the packages to also ensure delivery. The pickup devices additionally include a robotic delivery mechanism (similar to centralized locations) that inserts and removes packages from autonomous vehicles. In this embodiment, an autonomous vehicle must only drive near the pickup device (e.g., which may be placed at an intersection or other convenient location) to receive or delivery packages.

In some embodiments, the autonomous vehicles are personal or hired vehicles. However, in other embodiments, the autonomous vehicle may be larger delivery vehicles. In general, the mechanisms are similar to each. However, a larger delivery vehicle may also be configured to deliver packages to specific locations. In this manner, the delivery vehicles are controlled by a central location and are configured to pick up packages (at centralized locations or pickup devices) and perform door-to-door deliveries. In some embodiments, the delivery vehicles include an employee to make deliveries while in other embodiments the delivery devices are further configured to automatically drop off packages at locations. In one embodiment, each delivery vehicle is equipped with a drone device that may remove packages from the delivery vehicle and deliver the package directly to a destination, thus alleviating the safety and logistical concerns of purely drone-based delivery systems.

To support the above infrastructure, multiple methods and various embodiments thereof are described to manage the operation of autonomous vehicles and the infrastructure devices.

In one embodiment, routing methods and handoff methods are disclosed to coordinate the actions of multiple autonomous vehicles. In one embodiment, the methods describe techniques for planning routes of autonomous vehicles to avoid unnecessary diversions from a pre-planned route. For example, the methods may receive a start and end point and may determine a number of pickup devices (or centralized locations) that are within a predefined distance from the route. The method may then determine the number of available packages and their destinations and determine if any of those packages may be transported by the autonomous vehicle without deviating from a pre-planned route.

In another embodiment, the method describes handoff routines for ensuring that packages are transported efficiently. Given the routing methods, a given package may be coordinate to be handled by multiple autonomous vehicles using the pickup devices and centralized locations as waypoints along a delivery route. In this manner, the method may predict the volume of autonomous vehicle traffic based on historical autonomous vehicle traffic data to ensure that packages are only deposited at locations where another autonomous vehicle may shortly arrive.

In another embodiment, methods for managing package locations and availability are disclosed which enable a management system to proactively identify potential autonomous vehicles and organize pickups.

In one embodiment, a system is disclosed comprising a plurality of autonomous vehicles; a plurality of autonomous delivery structures configured to store a plurality of packages; and a central server configured to: receive requests for package transportation from a selected autonomous vehicle in the plurality of autonomous vehicles, identify a set of nearby packages, the nearby packages stored within a selected autonomous delivery structure in the plurality of autonomous delivery structures, transmit routing instructions to the selected autonomous vehicle, the routing instructions causing the selected autonomous vehicle to navigate to the selected autonomous delivery structure, instruct the selected autonomous delivery structure to deposit a selected package in the nearby packages into the autonomous vehicle upon detecting the presence of the selected autonomous vehicle calculate a waypoint for delivery of the selected package, and transmit transport routing instructions to the selected autonomous vehicle, the transport routing instructions causing the selected autonomous vehicle to navigate to the waypoint.

In another embodiment, a device is disclosed comprising a processor; and a storage medium for tangibly storing thereon program logic for execution by the processor, the stored program logic comprising: logic to receive requests for package transportation from a selected autonomous vehicle in a plurality of autonomous vehicles, logic to identify a set of nearby packages, the nearby packages stored within a selected autonomous delivery structure in a plurality of autonomous delivery structures, logic to transmit routing instructions to the selected autonomous vehicle, the routing instructions causing the selected autonomous vehicle to navigate to the selected autonomous delivery structure, logic to instruct the selected autonomous delivery structure to deposit a selected package in the nearby packages into the autonomous vehicle upon detecting the presence of the selected autonomous vehicle, logic to calculate a waypoint for delivery of the selected package, and logic to transmit transport routing instructions to the selected autonomous vehicle, the transport routing instructions causing the selected autonomous vehicle to navigate to the waypoint.

In another embodiment, a method is disclosed comprising receiving requests for package transportation from a selected autonomous vehicle in a plurality of autonomous vehicles; identifying a set of nearby packages, the nearby packages stored within a selected autonomous delivery structure in a plurality of autonomous delivery structures; transmitting routing instructions to the selected autonomous vehicle, the routing instructions causing the selected autonomous vehicle to navigate to the selected autonomous delivery structure; instructing the selected autonomous delivery structure to deposit a selected package in the nearby packages into the autonomous vehicle upon detecting the presence of the selected autonomous vehicle; calculating a waypoint for delivery of the selected package; and transmitting transport routing instructions to the selected autonomous vehicle, the transport routing instructions causing the selected autonomous vehicle to navigate to the waypoint.

The following detailed description describes the specific technical implementations of these operations, systems, and apparatuses.

BRIEF DESCRIPTION OF THE FIGURES

The preceding and other objects, features, and advantages of the disclosure will be apparent from the following description of embodiments as illustrated in the accompanying drawings, in which reference characters refer to the same parts throughout the various views. The drawings are not necessarily to scale; they instead illustrate principles of the disclosure.

DETAILED DESCRIPTION

Figure 1:
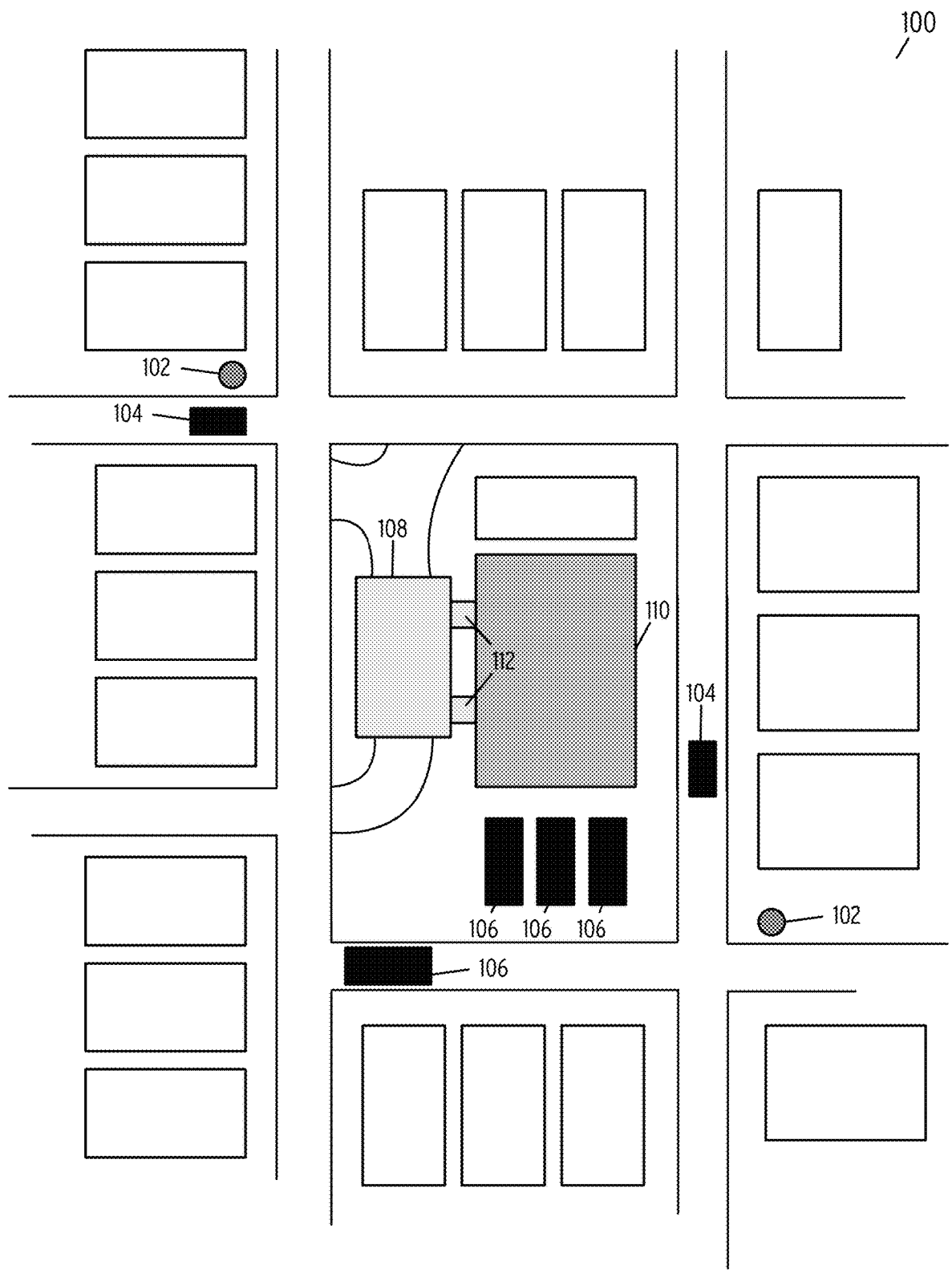
FIG. 1 is a graphical depiction of a local autonomous vehicle delivery network according to some embodiments of the disclosure.

FIG. 1 is a graphical depiction of a local autonomous vehicle delivery network according to some embodiments of the disclosure.

As illustrated, autonomous vehicles (104) and autonomous delivery vehicles (106) (referred to collectively as autonomous vehicles unless the distinction is needed) operate along streets of a local region (100). Interspersed through the region are multiple pickup devices (102) and centralized delivery locations (108) (referred to collectively as "autonomous delivery structures"). A pickup device refers to a location where autonomous vehicles (104) or autonomous delivery vehicles (106) may pick up or deposit packages.

Figure 8:
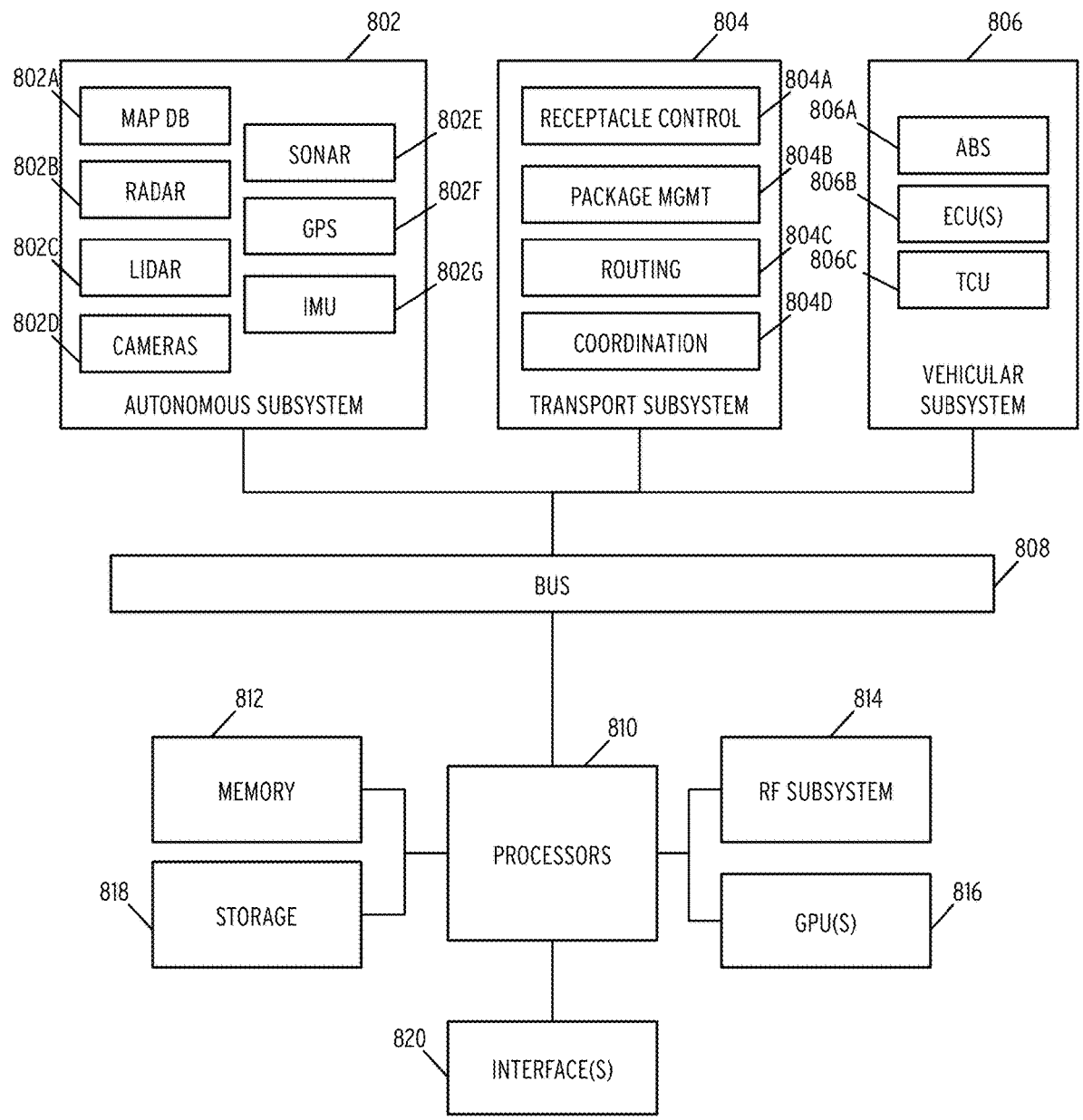
FIG. 8 is a block diagram of an autonomous vehicle according to some embodiments of the disclosure.

In one embodiment, an autonomous vehicle (104) may comprise an autonomous vehicle as depicted in FIG. 8, the disclosure of which is incorporated herein by reference in its entirety. In one embodiment, the autonomous vehicle (104) may comprise a standard autonomous vehicle equipped with delivery software (described herein). In one embodiment, the autonomous vehicle (104) may be equipped with a bomb-proof or chemical-proof storage location. In one embodiment, this location may be located in the trunk of the autonomous vehicle (104) or another suitable location. In one embodiment, the storage location is constructed of a material suitable to withstand damage from bombs or contamination from chemicals.

Within the region depicted in FIG. 1 are a plurality of pickup devices (102). As used herein, a pickup device refers to a secure storage location for packages. In some embodiments, customers may deposit packages for pick up within a given pickup device (102). In one embodiment, a pickup device (102) may include a bomb-proof and chemical-proof housing with a slot or other opening to receive packages. In some embodiments, packages are equipped with an identifying code (e.g., barcode, QR code, etc.). In one embodiment, these codes may be affixed to the packages before insertion into a pickup device (102). In alternative embodiments, the identifying codes may be placed on the packages by the pickup device (102) after deposit. In one embodiment, a pickup device (102) is equipped with a screen to allow a user to modify shipping options, pay for shipping, and perform other shipper-centric operations.

Internally, the pickup device (102) includes a dedicated storage area that stores each package deposited. In some embodiment, this may be in the form of shelving with individual "slots" to allow for programmatic access to a specific package. For instance, the pickup device (102) may include a map of package identifiers to slots to allow for programmatic access. In one embodiment, a pickup device includes a plurality of components to process packages after deposit. For instance, the pickup device may include an x-ray device, an explosive detection device, and a chemical detection device to ensure packages are safe for delivery. In one embodiment, the pickup device (102) includes a movable platform that moves vertically with respect to the pickup device (102). In this embodiment, a package is inserted and rests on the bottom of the pickup device (102) closest to the slot where the package is inserted. At this point, the package is located on a movable platform and is subject to x-ray scans. The platform then moves up and is scanned via bomb detection and chemical detection devices. If all checks pass, the platform may then move to a designated "row" of shelves. This row may be selected based on the capacity of the pickup device (102). In one embodiment, the movable platform comprises a conveyor belt which moves the package on to the shelving row. Likewise, the shelving row may include a conveyor belt portion which moves the package along the shelf to a designated location.

In one embodiment, the pickup device (102) includes, for each slot a door that may be opened robotically when a package is to be removed. In one embodiment, in response to the detection of an autonomous vehicle, the pickup device (102) activates a robotic arm on the exterior of the pickup device (102) which moves a robotic connector or "hand" to the door associated with the slot housing the desired package. In one embodiment, the arm unlocks the associated door and removes the package. Finally, the arm moves the package into a secure storage location in the autonomous vehicle (as discussed above). In alternative embodiments, the pickup device (102) may further place the packages into a standardized container after x-ray, bomb, and chemical scanning. In this manner, the robotic arm may only be configured to attach and detach to the standardized container. In one embodiment, the standardized container may be bomb-proof and/or chemical-proof. In this embodiment, the pickup device (102) may not use the x-ray, chemical, and explosive scanning devices.

To facilitate these interactions, the pickup device (102) is also configured with a processor, memory, wireless network interface, and other computing components to control the operation of the various components.

FIG. 1 additionally illustrates a centralized delivery location (108). As illustrated, the centralized delivery location (108) is accessible via a pull off from one or more of the roads of the region. In the illustrated embodiment, the centralized delivery location (108) may include a garage equipped with movable cranes to deposit packages into autonomous vehicles (104). In one embodiment, an autonomous vehicle (104) pulls into the centralized delivery location (108) and packages are moved across the roadway and dropped down into the secure location.

In the illustrated embodiment, a centralized delivery location (108) may be connected to a warehouse (110). In one embodiment, the warehouse (110) may comprise any type of standard delivery warehouse with associated machinery to package and coordinate packages. In one embodiment, all packages may reside in the warehouse (110) until requested by an autonomous vehicle (104) or autonomous delivery vehicle (106). In the illustrated embodiment, packages may be moved from the warehouse (110) via a pair of alternately moving conveyors (112). In some embodiments, the centralized delivery location (108) additionally includes a temporary storage location whereby packages may be queued for insertion before the arrival of an autonomous vehicle (104) or an autonomous delivery vehicle (106).

Figure 2:
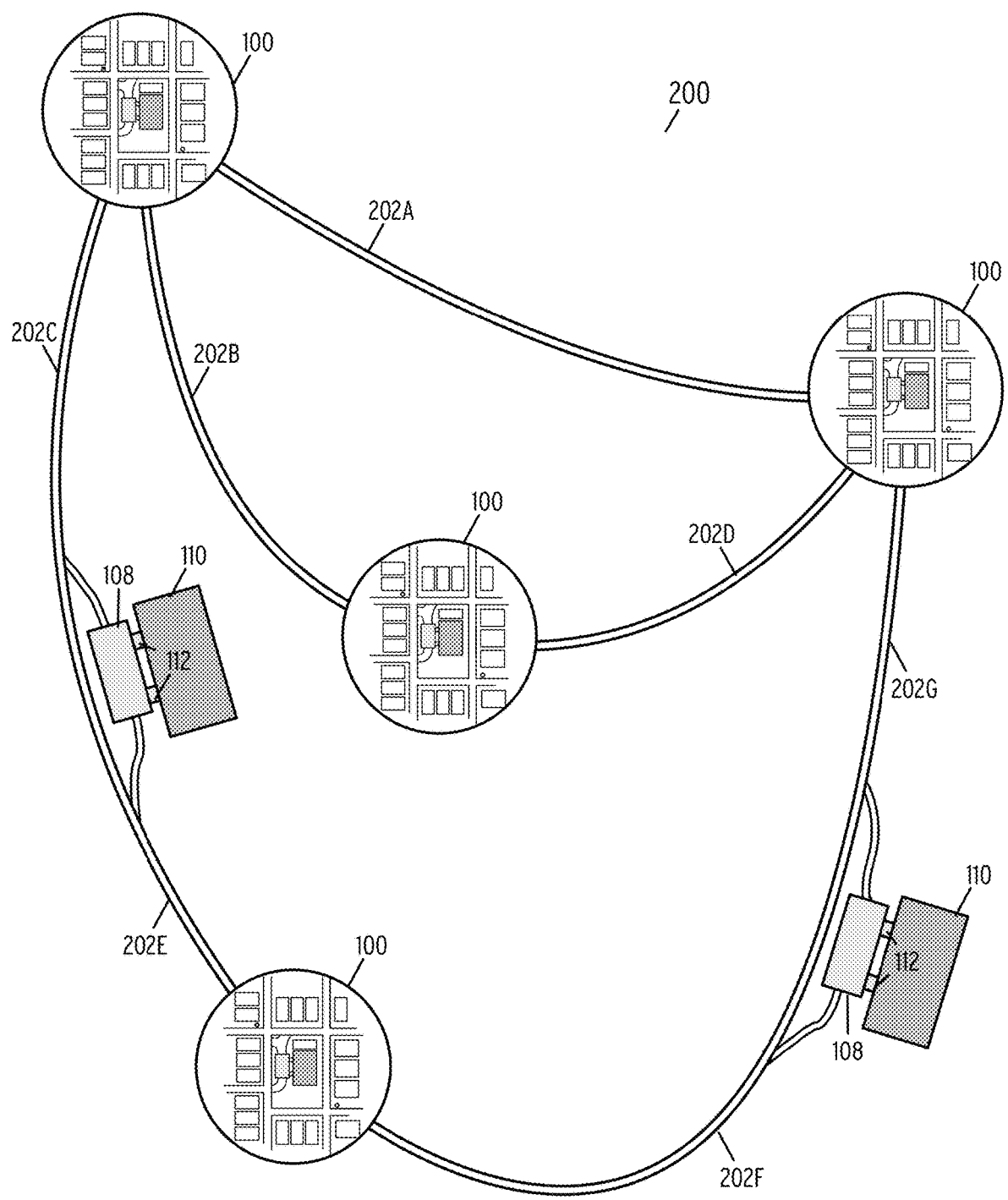
FIG. 2 is a graphical depiction of a regional autonomous vehicle delivery network according to some embodiments of the disclosure.

FIG. 2 is a graphical depiction of a regional autonomous vehicle delivery network according to some embodiments of the disclosure.

The embodiment illustrated in FIG. 2 includes many of the same elements as discussed in FIG. 1 and the details of these components are not repeated herein for the sake of clarity.

In the illustrated embodiment, multiple local regions (100) are connected via long-distance routes (202A-202G) (e.g., highways). In the illustrated embodiment, local regions (100) correspond to the region discussed in FIG. 1, the details of which are incorporated by reference in its entirety.

Located along certain routes (202C, 202E and 202F, 202G) are inter-region centralized delivery locations (108). These centralized delivery locations (108) are connected to inter-region warehouses (110). Notably, the centralized delivery locations (108) and warehouses (110) may be similar or identical to the locations and warehouses discussed in FIG. 1. In contrast to intra-region centralized delivery locations and warehouses, the centralized delivery locations (108) in FIG. 2 are situated along long-distance routes to enable handoffs of packages between local regions (100). The details of the use of such locations in coordinate handoffs is described more fully herein.

Although illustrated as a small number of regions (100) and routes (202A-202G), the disclosed embodiments do not limit the number of regions and routes serviced by the disclosed systems and methods.

Figure 3:
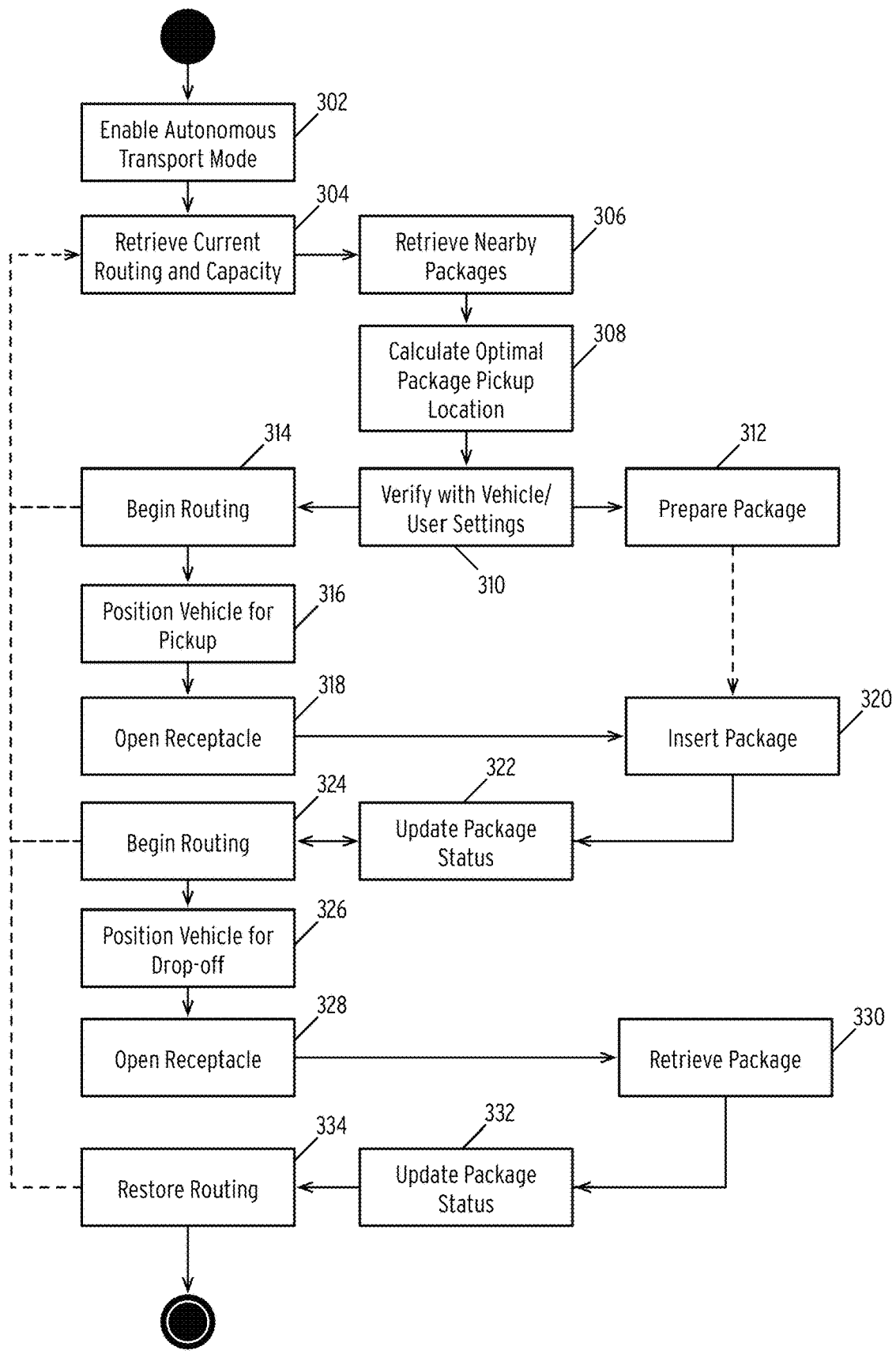
FIG. 3 is a flow diagram illustrating a method for controlling an autonomous vehicle according to some embodiments of the disclosure.

FIG. 3 is a flow diagram illustrating a method for controlling an autonomous vehicle according to some embodiments of the disclosure.

In step 302, the method enables an autonomous transport mode.

In one embodiment, an autonomous transport mode may be enabled in response to a user command. For example, a passenger of an autonomous vehicle may select an option on a user interface to enable the autonomous transport mode. In some embodiments, the method may prompt the user to enable the autonomous transport mode (e.g., by displaying a list of candidate packages).

In other embodiments, the method may automatically enable an autonomous transport mode. In this embodiment, the method may enable an autonomous transport mode for an autonomous vehicle that is not currently occupied. For example, the method may enable the autonomous transport mode in response to detecting that an autonomous vehicle is not likely to be used in the near future. In some embodiments, the determination that an autonomous vehicle will not be used may be made using a predictive model of the available and unavailable times. Additionally, the method may utilize a user profile which specifies whether the autonomous vehicle can be utilized during times when the autonomous vehicle is not being used.

In step 304, the method retrieves a current routing and capacity of the autonomous vehicle that enables the autonomous transport mode.

In one embodiment, the current routing may be null (e.g., if the autonomous vehicle is not being used). In other embodiments, if the autonomous vehicle is currently being used, it may be associated with a start point, and destination, as well as routing instructions (e.g., identifications of roadways), used to maneuver the autonomous vehicle. In one embodiment, the capacity may be monitored as a state variable of the autonomous vehicle by the method. That is, the method may store a list of package locations and an identification of which autonomous vehicles are currently transporting packages.

In step 306, the method retrieves a list of nearby packages.

In one embodiment, the nearby packages comprise a list of packages within a preset distance from the current routing of the autonomous vehicle. In one embodiment, the preset distance comprises a distance the autonomous vehicle must deviate from an existing route to reach the package. For example, a user may specify that during the transport mode, the autonomous vehicle should not travel more than one mile to facilitate package pickups.

In some embodiments, the method may alternatively use a preset delay time to calculate the nearby packages. For example, a user may specify that during the transport mode, the autonomous vehicle should not deviate more than 10 minutes from a current route to facilitate package pickups.

In the illustrated embodiment, the nearby packages includes the package details (e.g., weight, size, postage costs, etc.) as well as location details (e.g., latitude/longitude, location type, In step 308, the method calculates an optimal package pickup location. The details of scheduling pickups are described more fully in the description of FIGS. 6 and 7, incorporated herein by reference in its entirety.

In step 310, the method verifies the pickup with the vehicle and in accordance with user settings. In one embodiment, the method alerts the user of the scheduled pickup (or multiple pickups) and allows the user to confirm whether or not the pickup is acceptable. In other embodiments, the method may confirm the pickups using a user profile (e.g., for operation when an autonomous vehicle is not being used).

The method then performs steps 312 and 314 in parallel.

In step 312, the method prepares a package for pickup. In one embodiment, step 312 may be performed by a pickup device or a centralized delivery location (discussed in more detail in FIGS. 1 and 2).

In one embodiment, preparing a package at a pickup device may comprise confirming that the package exists. Additionally, the method may instruct the pickup device to move the package to a more convenient location for pickup. Additionally, the method may transmit details regarding the autonomous vehicle to the pickup device. In some embodiments, the pickup device may monitor the location of the autonomous vehicle until detecting the autonomous vehicle. In other embodiments, a central server may transmit status updates of the autonomous vehicle to the pickup device.

Alternatively, or in conjunction with the preceding, preparing a package may comprise alerting a centralized delivery location to prepare the package. In one embodiment, a warehouse may store the package to be picked up. In this scenario, the warehouse machinery is configured to locate the package and move the package from a long-term storage area to a centralized delivery location (e.g., via an automated process described previously). In some embodiments, the package may be verified and prepared and stored temporarily at the centralized delivery location until the autonomous vehicle arrives.

As illustrated, the pickup device or centralized delivery location then waits until the vehicle arises before inserting the package in step 320.

In step 314, the method beings routing the autonomous vehicle to the location of the package (e.g., a pickup device or centralized delivery location).

In one embodiment, the method utilizes existing routing techniques for routing the autonomous vehicle to the location of a package (e.g., using the package location as a waypoint).

In the illustrated embodiment, the method may continuously execute steps 304-314 while the autonomous vehicle is in motion. In this manner, the method may continue to update the availability of potential packages in real-time as the vehicle is in transit, allowing the vehicle to pick up and deliver multiple packages.

In step 316, the method positions the vehicle for pickup.

Once the autonomous vehicle reaches the location of the package, software on the autonomous vehicle may control the vehicle to precisely position the vehicle. In one embodiment, the method searches for a positioning mark of the pickup device or on the roadway within a centralized delivery location and uses one or more of digital cameras, sonar, or Lidar to position the vehicle accurately. In one embodiment, positioning the vehicle comprises aligning a secure receptacle of the vehicle (e.g., trunk) in a manner to allow for insertion of the package.

In step 318, the method unlocks the secure receptacle.

In one embodiment, the secure receptacle is only capable of being opened by the method (i.e., and not by a human entity). In one embodiment, the method transmits a signal to a lock of the receptacle to trigger an unlocking of the receptacle. In some embodiments, the method may further transmit a signal to open the receptacle after unlocking. Additionally, the method may transmit a signal to the pickup device or centralized delivery location indicating that the autonomous vehicle is ready to accept packages.

In step 320, the method inserts the package into the autonomous vehicle (via the receptacle).

In one embodiment, the method transmits an instruction to a pickup device to activate a robotic arm. In one embodiment, the robotic arm retrieves the package from the pickup device and, after confirming a secure connection, moves the package into the receptacle, finally releasing the package. Similarly, if executed by a centralized delivery location, the method instructs a crane to lower the package into the secure receptacle and release the package.

Additionally, the method may transmit a notification from the pickup device (or centralized delivery location) to a central server confirming the package has been inserted. The method may then instruct the autonomous vehicle to close the secure receptacle. Further, the method may signal to the autonomous vehicle that routing may be resumed.

In step 322, the method updates the package status.

In one embodiment, updating the package status may comprise associating the package with an identifier (e.g., vehicle identification number (VIN)) of the autonomous vehicle and assigning the location of the package to the location of the autonomous vehicle (which may be periodically monitored or broadcast).

In one embodiment, steps 324-328 are performed in a manner similar to or identical to that described in the description of steps 314-318, the description of which is incorporated by reference in its entirety. As illustrated, the method may re-execute steps 304-328 to enable the pickup or delivery of additional packages.

In step 330, the method retrieves a package from an autonomous vehicle once the autonomous vehicle has arrived at a delivery location (interim or final) and opens the receptacle for delivery. Similar to the embodiments described above, the method may control a robotic arm to remove the package from the receptacle and insert the package into a pickup device. Alternatively, or in conjunction with the preceding, the method may control a robotic crane to remove the package from an autonomous vehicle and deposit the package at a centralized delivery location.

In step 332, the method updates the package status similar to that performed in step 322. In one embodiment, the update in step 332 comprises marking the package as delivered and updating the position of the package in the delivery network.

In step 334, the method restores the routing of the autonomous vehicle. In one embodiment, this may comprise instructing the autonomous vehicle to continue on a pre-defined route. In other embodiments, this may comprise directing the autonomous vehicle to return to an original location if the autonomous vehicle was configured to transport packages during an availability period.

In the illustrated embodiment, the method may continuously execute steps 304-334 to enable multiple package pickups and drop-offs. In this manner, the method may continue to update the availability of potential packages in real-time as the vehicle is in transit, allowing the vehicle to pick up and deliver multiple packages.

Figure 4:
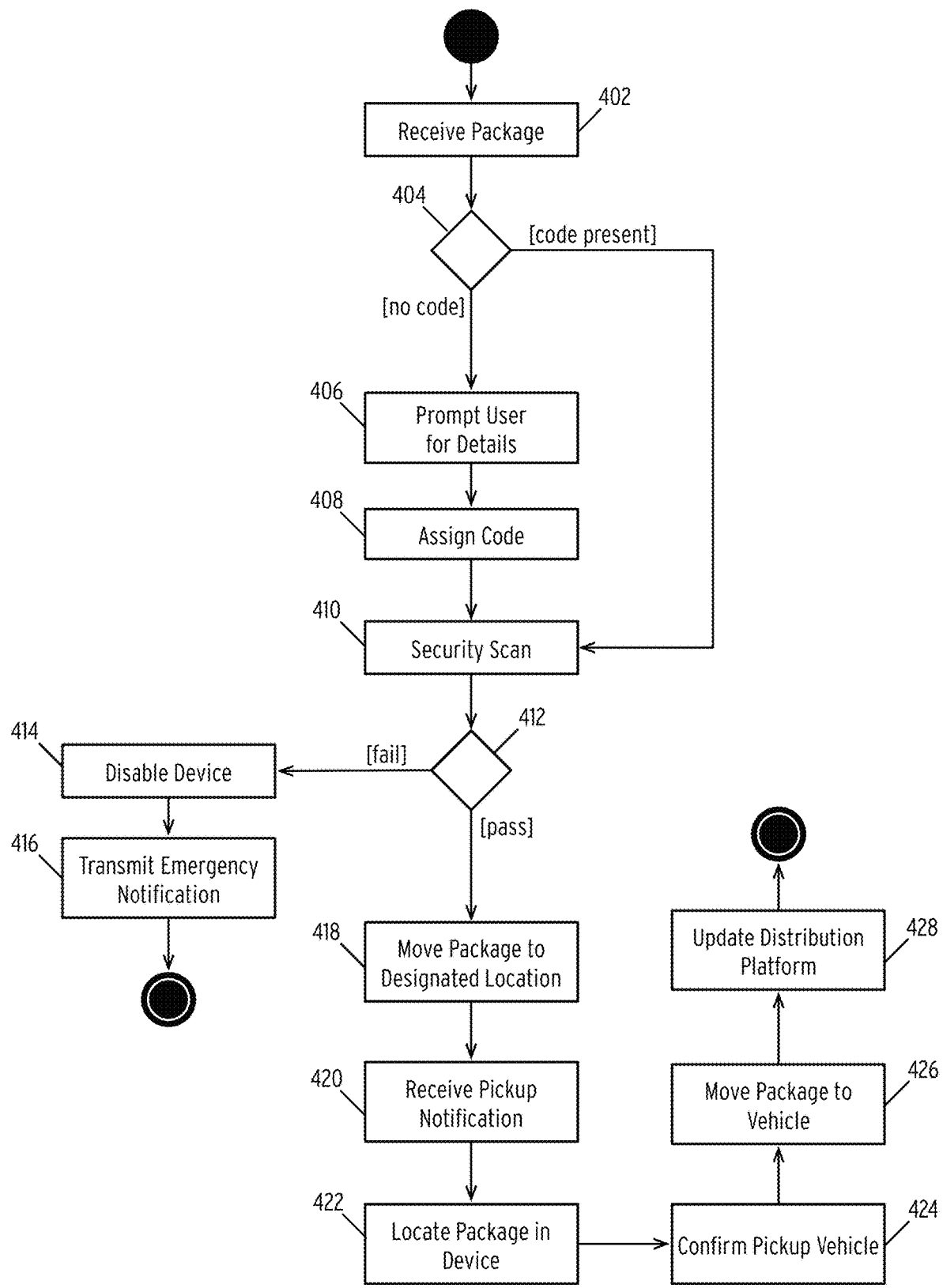
FIG. 4 is a flow diagram illustrating the operation of a pickup device according to some embodiments of the disclosure.

FIG. 4 is a flow diagram illustrating the operation of a pickup device according to some embodiments of the disclosure.

In step 402, the method receives a package.

In one embodiment, a package may be received by detecting that a package has been inserted into the pickup device. For example, the pickup device may include a slot or drawer that enables persons to insert packages. In one embodiment, the method utilizes a laser to detect when a package has passed a threshold and is deemed to be received by the pickup device. Alternatively, or in conjunction with the preceding, the method may receive a package via an indication from a sender (e.g., via a user interface on the pickup device) that a package has been inserted into a pickup device.

In step 404, the method determines if a code is present on the package.

In one embodiment, a package may have an identifying code on at least two sides of the package and, optionally, on more than two sides. In one embodiment, after being received, the package is located on a movable platform. The platform is situated in the center of one or more optical scanners that periodically scan the package to detect a code (e.g., a barcode, QR code, RFID, or similar code).

In step 406, if the method does not detect a code, the method prompts the user for details of the package.

In one embodiment, the method may prompt the user for the shipper details (e.g., "from" address), the recipient details (e.g., a "to" address), the package contents, a level of insurance, and any other standard shipping details.

In step 408, the method assigns a code to the package. In one embodiment, the method may further place a barcode, QR code, RFID tag, or other identifying code on the package to finalize the package for insertion.

In step 410, or after detecting a code, the method performs a security scan on the package. In one embodiment, the security scan comprises an x-ray, explosion scan, and chemical scan, as described previously. In one embodiment, the method moves the package upward through a series of "checkpoints" for each type of scan and then returns the package to the bottom of the pickup device.

In one embodiment, the method may utilize a machine learning model to classify the contents of the package using the x-ray images of the package. In one embodiment, the model is configured to classify the package as dangerous or not dangerous (and varying degrees thereof). In some embodiments, the method may additionally categorize the package based on the contents (e.g., perishable, non-perishable).

In step 412, the method determines if the package has passed all security checks.

If not, in step 414, the method disables the pickup device and, in step 416, transmits an emergency notification.

In one embodiment, the method may disable all operations of the pickup device upon detecting that the package contains, for example, explosive or chemical material. In one embodiment, the method may alert local law enforcement or a technician to attend to manual inspection of the package. In some embodiments, the method may alternatively reject the package and eject the package from the pickup device.

Alternatively, if the method determines that all security checks have passed, the method may transmit the identifying code of the package (and the package details) to a central server for management. In one embodiment, the notification includes an identifier of the pickup device to begin tracking the location of the package.

In step 418, the method moves the package to a designated location.

In one embodiment, the pickup device includes multiple shelves with multiple locations on each shelf. Each shelf includes a conveyor belt to move packages along the shelf. In one embodiment, each location includes downward extending partitions to enable the conveyor belt to move while packages already in locations do not move. In one embodiment, the pickup device fills locations furthest away from the insertion point first. In the illustrated embodiment, the method moves the movable platform to the closest shelf that has a location available. The method may then rotate a conveyor belt on the movable platform toward the shelf to move the package off the platform onto the shelf. The shelf conveyor belt receives the package and moves the package to the furthest available slot at which point the partitions are moved downward to "lock" the package into the location.

In the illustrated embodiment, the method records the identity of the location where the package is moved to and uses this identity to facilitate future pickups.

In step 420, the method receives a pickup notification and, in step 422, locates the package in the pickup device.

In one embodiment, the pickup notification is received from a central server and includes the identifying code of the package. In some embodiments, the notification additionally includes an identification of an autonomous vehicle scheduled to pick up the package. In steps 420 and 422, the method uses the identifying code to identify the location of the package and stores the location of the package, the autonomous vehicle, and an estimated pickup time in memory.

In step 424, the method confirms the autonomous vehicle.

In one embodiment, as described above, the autonomous vehicle positions itself near an identifying mark of the pickup device. In response, the pickup device may use near-field communication to confirm the identity of the autonomous vehicle. Alternatively, the pickup device may capture an image of an identifying mark (e.g., license plate number) of the autonomous vehicle and use a machine learning model to extract the license number to confirm the vehicle.

In step 426, the method moves the package to the autonomous vehicle.

As described above, in one embodiment, the pickup device is equipped with an external robotic arm, and each location in the pickup device has an outward-facing door. In step 426, the method controls the robotic arm to position a hook, hand, or other terminus of the arm at the door associated with the identified package location. In response, the pickup device may unlock the door, and the arm may extend inward to attach to the package (or a package container). The arm may then move outward to remove the package and close the door. The arm then rotates to position the package within a receptacle of the autonomous vehicle. Finally, the terminus of the arm detaches the package when the package is within the receptacle.

In step 428, the method updates the distribution platform at the central server.

In one embodiment, the method transmits a notification that the package identified by the identifying code has been successfully deposited in the autonomous vehicle. This notification may trigger the central server to remove the package from a manifest of the pickup device and begin tracking the package in the autonomous vehicle as described in connection with FIG. 3.

Figure 5:
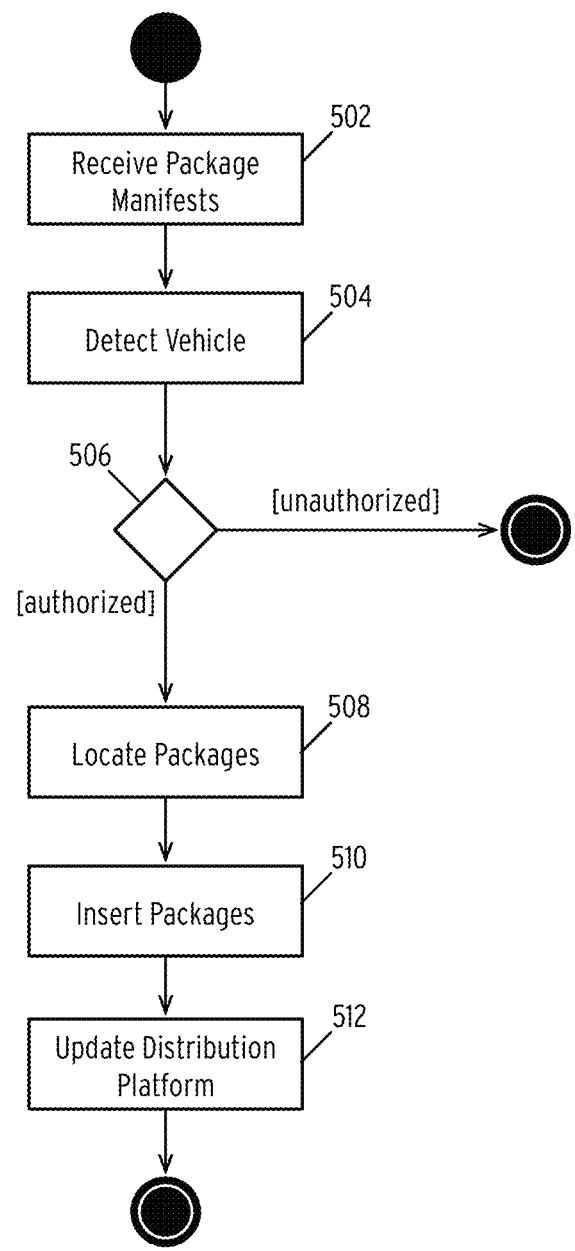
FIG. 5 is a flow diagram illustrating the operation of a centralized delivery location according to some embodiments of the disclosure.

FIG. 5 is a flow diagram illustrating the operation of a centralized delivery location according to some embodiments of the disclosure.

In step 502, the method receives package manifests.

As described above, a centralized delivery location may include a large number of packages due to its function as a hub. In step 502, a central server transmits a list of only those packages that will be transported in the near future. Thus, the package manifest includes a subset of all packages under the control of the centralized delivery location. In one embodiment, in response to the package manifests, the packages in a warehouse may be moved from the warehouse to the centralized delivery location equipment for temporary storage while autonomous vehicles are arriving. As described above, the packages in the package manifests may be moved via conveyor belts from a warehouse to the centralized delivery location.

In step 504, the method detects an autonomous vehicle. In some embodiments, the detection of a vehicle may be performed as described in the description of step 424, the disclosure of which is incorporated herein by reference in its entirety.

In step 506, the method determines if the autonomous vehicle is authorized. In one embodiment, this determination may be made based on confirming whether an identity of the autonomous vehicle is included within the package manifest.

In step 508, the method locates packages within the centralized delivery location.

In one embodiment, the centralized delivery location may include a temporary storage location with a plurality of locations housing packages. Thus, in the illustrated embodiment, the method may perform a method similar to that described in step 422, the disclosure of which is incorporated herein by reference in its entirety.

In step 510 and 512, the method inserts the package(s) and updates the distribution platform, respectively. In one embodiment, the method performs these steps in a manner similar to that described in step 426 and 428, the disclosure of which is incorporated herein by reference in its entirety.

Figure 6:
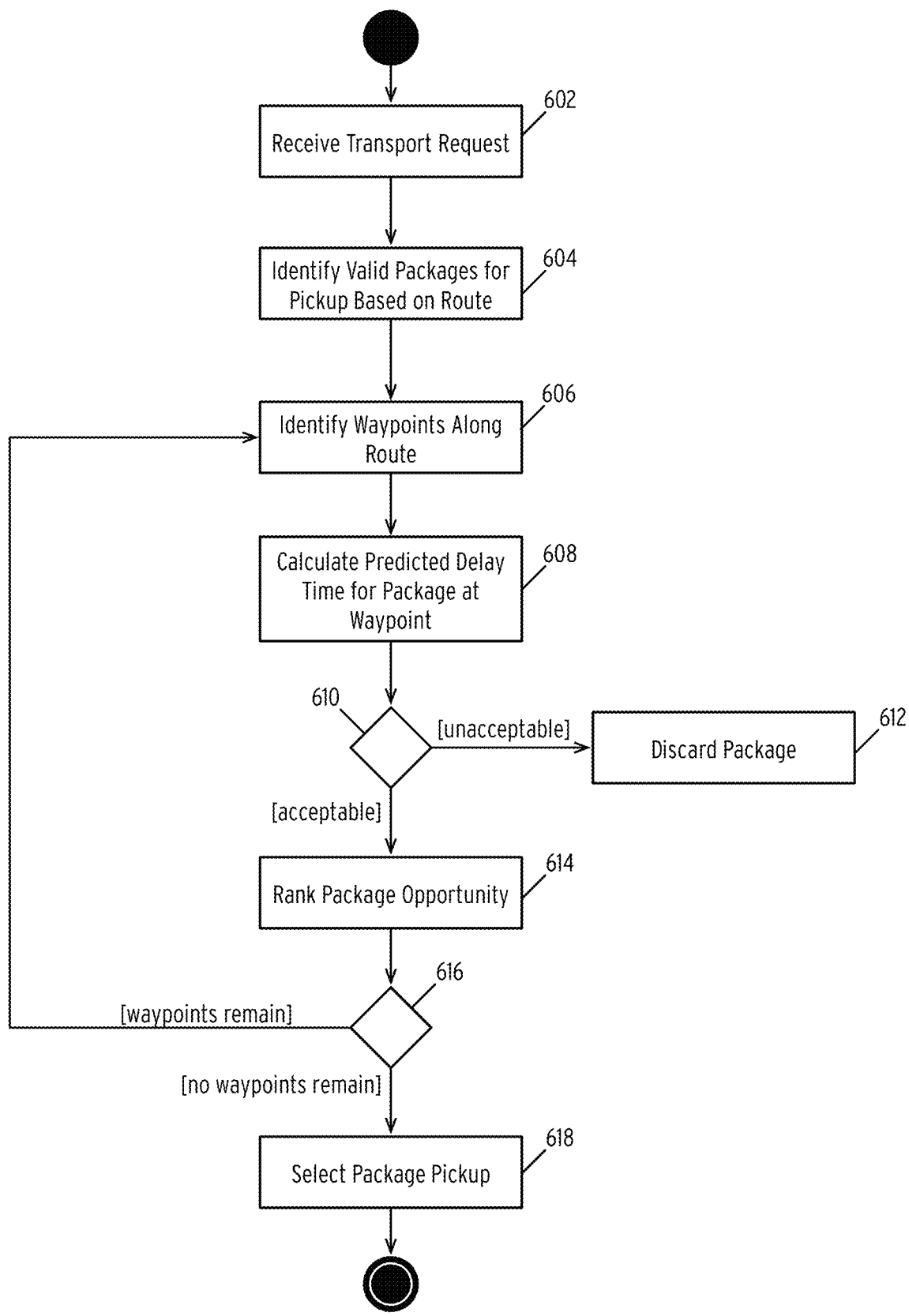
FIG. 6 is a flow diagram illustrating a handoff method according to some embodiments of the disclosure.

FIG. 6 is a flow diagram illustrating a handoff method according to some embodiments of the disclosure.

In step 602, the method receives a transport request.

In one embodiment, the transport request may be included as part of the autonomous transport mode enablement request issued in step 302, the disclosure of which is incorporated herein by reference in its entirety.

In step 604, the method identifies valid packages for pickup based on a route of an autonomous vehicle issuing the transport request similar to or identical to that described in steps 304-308 described previously and incorporated by reference in its entirety.

In step 606, the method identifies waypoints along a package route.

As will be described in FIG. 7, a package includes a start point (e.g., a pickup device or centralized delivery location) and includes a destination. In one embodiment, the method calculates multiple routes between the start point and the destination and identifies, along each route, a number of waypoints. In one embodiment, a waypoint refers to a pickup device or centralized delivery location that is located on a route between the start point and a destination. In some embodiments, the waypoints may be limited to those waypoints within a predefined distance (or time) from the autonomous vehicle's existing route.

In step 608, the method calculates a predicted delay at each identified waypoint.

A given waypoint may comprise a candidate for interim delivery along the route to the package destination. However, different waypoints are associated with different delays. For example, a waypoint in a heavily trafficked area may experience little or no delay. However, a waypoint in a rural setting may experience long delays or sporadic delays.

In one embodiment, the method records the number of autonomous vehicles visiting each waypoint including the time between visits. Using this historical record, the method can build a predictive model of autonomous vehicle visits. Thus, in one embodiment, the method can predict an estimated amount of time between a drop off time and the next autonomous vehicle available for pickup. In step 608, the method predicts this delay time for each waypoint and assigns the predicted delay to each waypoint for each package.

In step 610, the method determines if the waypoint has an acceptable delay. In some embodiments, the delay for a given waypoint may exceed a minimum service level for deliveries. In this embodiment, the method may immediately discard the package (step 612) as a potential candidate for pickup given the length of the delay.

If the delay is acceptable, the method ranks the package opportunity in step 614.

In one embodiment, the package may be ranked based on the accumulated delays along waypoints. In some embodiments, the method may segment a given route at a waypoint if a delay at a given waypoint is acceptable in step 610. In some embodiments, the method may also rank the waypoints based on the time it will take for the autonomous vehicle to reach the waypoint, the amount of compensation given to the owner of the autonomous vehicle for the delivery or any other factors.

In step 616, the method determines if further waypoints exist to analyze and, if so, executes steps 606 through 614 for each remaining waypoint. Thus, at the end of step 616, the method includes a set of routes starting at a start point and passing through one or more waypoints. Some routes may terminate at the destination while others may terminate at a waypoint. Each generated route is associated with a ranking that is used for selection.

In step 618, the method selects a package pickup based on the routes.

In one embodiment, the method sorts the ranked routes and selects the highest ranking route(s) for activation for the given autonomous vehicle. After selecting the route(s) the method identifies the packages with the routes and transmits the packages to the autonomous vehicle to begin the routing process (as described in steps 314-334).

Figure 7:
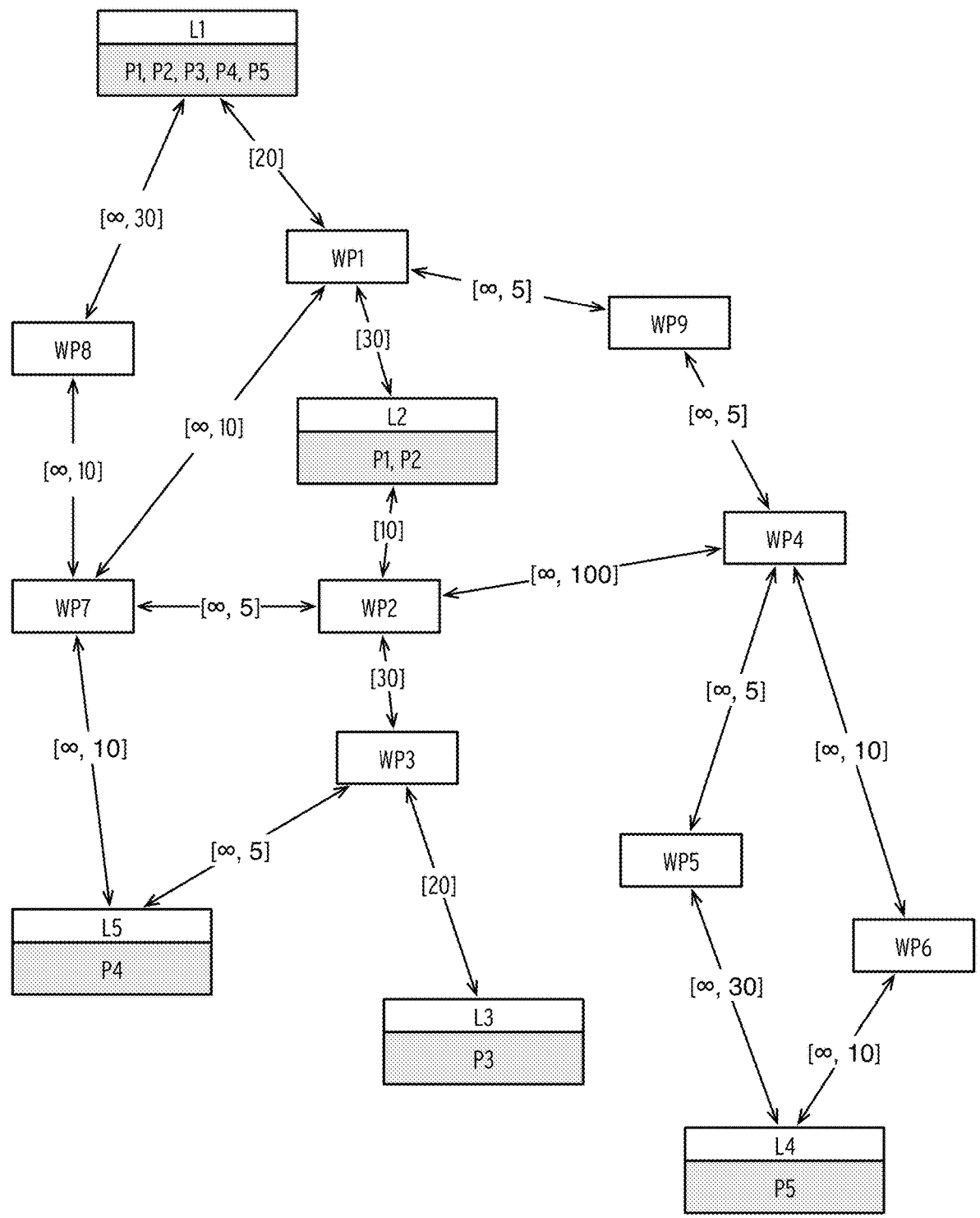
FIG. 7 is a graph depicting a handoff scenario according to some embodiments of the disclosure.

FIG. 7 is a graph depicting a handoff scenario according to some embodiments of the disclosure.

In the illustrated graph, locations L1 through L5 are illustrated as well as waypoints WP1 through WP7. Additionally, five packages P1 through P5 are illustrated as being initially located at location L1. Packages P1 and P2 are to be delivered to L2 and packages P3, P4, and P5 are to be delivered to locations L3, L4, and L5, respectively. Additionally illustrated are lines representing travel routes between locations and waypoints, each line representing a value indicating the cost of the route (e.g., in minutes or miles). Notably, an edge marked as infinity refers to a route that is not available to a vehicle. Additionally, edges marked with infinity also include the estimated costs if such route was available. In the illustrated example, a vehicle is starting a location L1 and traveling to location L3, traveling past waypoints WP1, WP2 and WP3 and location L2.

At location L1, the system determines which packages to place in the autonomous vehicle. In one embodiment, the system iterates through all packages to calculate the time to delivery to a location or waypoint and factors the predicted handoff delay.

Packages P1, P2, and P3 are capable of being delivery directly by the autonomous vehicle with no handoff. In the illustrated embodiment, the cost for packages P1 and P2 is 50 (the sum of the routes). If this cost is acceptable, the packages are placed within the autonomous vehicle. In some embodiments, the costs are determined based on the mileage as well as the historical performance of the vehicle. For package P3, the cost is 110 (again, the sum of the routes). In one embodiment, the system may determine that this cost is unacceptable, or other autonomous vehicles may complete the delivery in a short time. For example, an autonomous vehicle traveling from L1 to L3 via WP8, WP7, L5, and WP3 has a cost of 75 and thus is more efficient. Thus, the system may select packages P1 and P2 for delivery and may save package P3 for later delivery.

Concerning packages P4 and P5, no direct delivery is possible given the autonomous vehicle's route. Thus, the method identifies the furthest waypoint or location that the autonomous vehicle may deliver the vehicle to minimize travel time. For P4, the following exemplary routes exist:

1. L1→WP8→WP7→L5 (90)
2. L1→WP1→L2→WP2→WP3→L5 (95)
3. L1→WP1→WP7→L5 (80)
4. L1→WP1→L2→WP2→WP7→L5 (75)

In one embodiment, the system may select a route (3) as being the shortest route for P4 and may instruct the autonomous vehicle to deliver P4 to WP1, coordinating a handoff to another vehicle between WP1 and L5 (via WP7).

In one embodiment, the method may adjust the edge costs with predicted delay times. Thus, the method may reevaluate the routes as follows:

1. L1→WP8→WP7→L5 (300)
2. L1→WP1→L2→WP2→WP3→L5 (105)
3. L1→WP1→WP7→L5 (150)
4. L1→WP1→L2→WP2→WP7→L5 (150)

Here, routes (1), (3), and (4) are substantially increased. In the illustrated embodiment, WP7 and WP8 may correspond to waypoints on a less frequently traveled roadway. Thus the handoff delays are increased. As described above, these delays may be predicted based on past autonomous vehicle activity along the routes. Thus, in this example route (2) despite being the longer route in the original calculate routes is the shortest when factoring in autonomous vehicle frequency. Thus, the system may instruct the autonomous vehicle to deliver P4 to WP3 and coordinate a handoff between WP3 and L4.

A similar procedure would be performed for P5, the details not included for the sake of clarity. However, in one embodiment, the method may instruct the autonomous vehicle to deliver P5 to WP1 and handoff the package to another autonomous vehicle traveling between WP1 and L4, to avoid the costly route between WP2 and WP4.

Note that the above description does not attempt to cover all permutations of routing and is intended to be exemplary only.

FIG. 8 is a block diagram of an autonomous vehicle according to some embodiments of the disclosure.

The system includes an autonomous vehicle subsystem (802). In the illustrated embodiment, autonomous vehicle subsystem (802) includes map database (802A), radar devices (802B), Lidar devices (802C), digital cameras (802D), sonar devices (802E), GPS receivers (802F), and inertial measurement units (802G). Each of the components of autonomous vehicle subsystem (802) comprises standard components provided in most current autonomous vehicles. In one embodiment, map database (802A) stores a plurality of high-definition three-dimensional maps used for routing and navigation. Radar devices (802B), Lidar devices (802C), digital cameras (802D), sonar devices (802E), GPS receivers (802F), and inertial measurement units (802G) may comprise various respective devices installed at various positions throughout the autonomous vehicle as known in the art. For example, these devices may be installed along the perimeter of a vehicle to provide location awareness, collision avoidance, and other standard autonomous vehicle functionality.

Vehicular subsystem (806) is additionally included within the system. Vehicular subsystem (806) includes various anti-lock braking systems (806A), engine control units (802B), and transmission control units (802C). These components may be utilized to control the operation of the autonomous vehicle in response to the streaming data generated by autonomous vehicle subsystem (802A). The standard autonomous vehicle interactions between autonomous vehicle subsystem (802) and vehicular subsystem (806) are known in the art and are not described in detail herein. Vehicular subsystem (806) additionally includes one or more sensors (806D) such as airbag sensors, impact sensors, and other sensors known in the art.

The processing side of the system includes one or more processors (810), short-term memory (812), an RF system (814), graphics processing units (GPUs) (816), long-term storage (818) and one or more interfaces (420).

The one or more processors (810) may comprise central processing units, FPGAs, or any range of processing devices needed to support the operations of the autonomous vehicle. Memory (812) comprises DRAM or other suitable volatile RAM for temporary storage of data required by processors (810). RF system (814) may comprise a cellular transceiver and satellite transceiver. Long-term storage (818) may comprise one or more high-capacity solid-state drives (SSDs). In general, long-term storage (818) may be utilized to store, for example, high-definition maps, routing data, and any other data requiring permanent or semi-permanent storage. GPUs (816) may comprise one or more high throughput GPU devices for processing data received from autonomous vehicle subsystem (802). Finally, interfaces (420) may comprise various display units positioned within the autonomous vehicle (e.g., an in-dash screen).

The system additionally includes a transport subsystem (804) which performs all of the data collection and processing required by the methods illustrated in the preceding Figures. In the illustrated embodiment, the transport subsystem (804) includes a receptacle control unit (804A). In one embodiment, the receptacle control unit (804A) is configured to open and close a secure receptacle, as described previously. The transport subsystem (804) additionally includes a package management unit (804B). In the illustrated embodiment, the package management unit (804B) is configured to manage packages in the secure receptacle. For example, package management unit (804B) provides optional scanning of packages (e.g., explosive, chemical, etc.) as described previously. The package management unit (804B) may additionally be configured to scan identifying codes of packages to monitor what packages are safely secured in the receptacle. The package management unit (804B) may additionally manage incoming package requests from a central server. The transport subsystem (804) additionally includes a routing unit (804C). In one embodiment, the routing unit (804C) is configured to determine a current route and transmit the current route to a central server. The routing unit (804C) may additionally be configured to coordinate a transport route for delivering packages as described above. The transport subsystem (804) additionally includes a coordination unit (804D). In one embodiment, the coordination unit (804D) is configured to manage handoffs on the vehicle side, as described more fully in connection with FIGS. 6 and 7. In one embodiment, the coordination unit (804D) is additionally configured to manage interactions with pickup devices and centralized delivery locations.

Each of the devices is connected via a bus (808). In one embodiment, the bus (808) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 9:
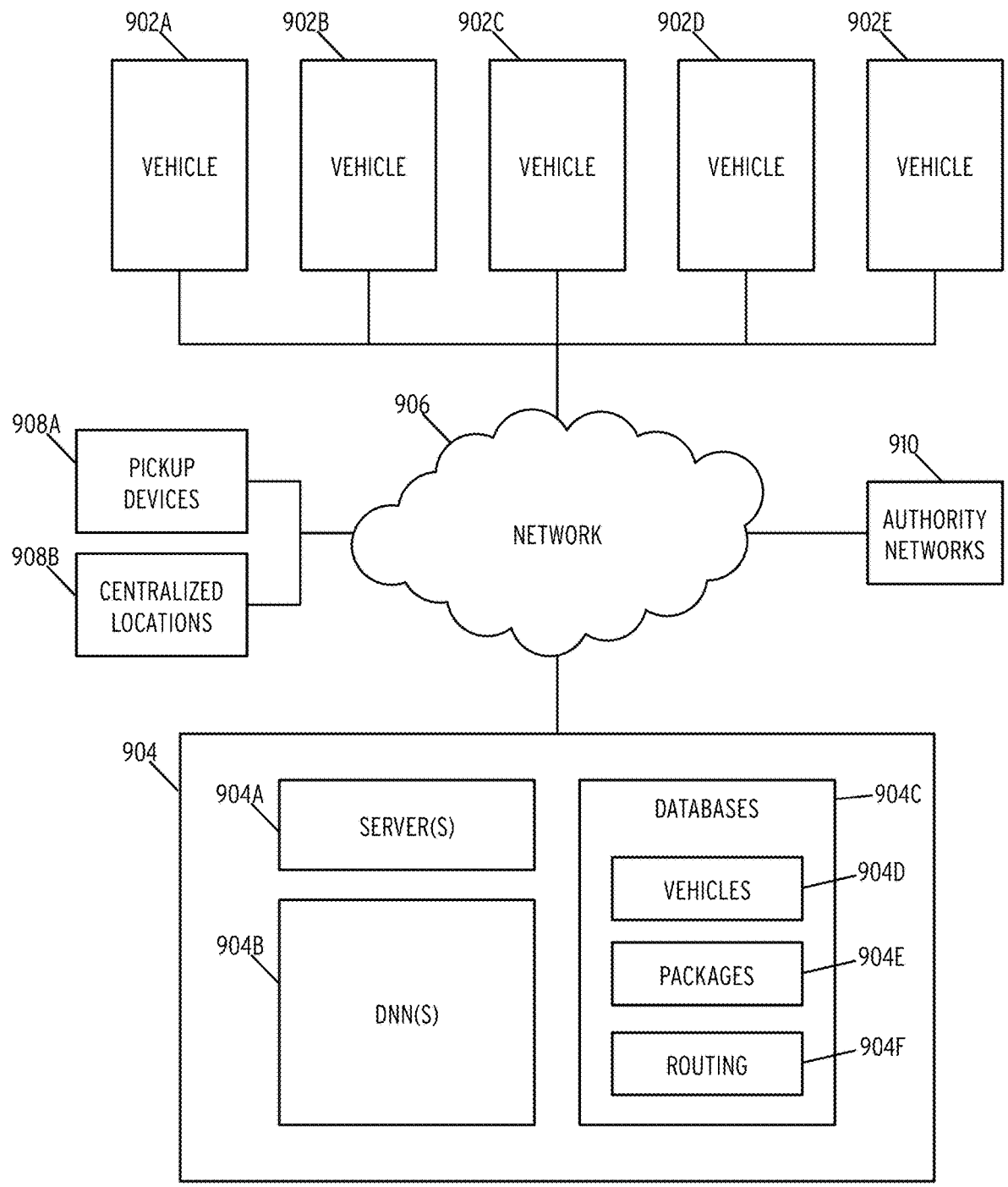
FIG. 9 is a block diagram of a centralized autonomous vehicle operations system according to some embodiments of the disclosure.

FIG. 9 is a block diagram of a centralized autonomous vehicle operations system according to some embodiments of the disclosure.

As illustrated, the system includes a number of autonomous vehicles (902A-502E). In one embodiment, each autonomous vehicle may comprise an autonomous vehicle such as that depicted in FIG. 8, the disclosure of which is incorporated herein by reference in its entirety. Each autonomous vehicle (902A-502E) may communicate with a central system/server (904) via a network (906). In one embodiment, network (906) comprises a global network such as the Internet.

Central system (904) includes a plurality of servers (904A). In one embodiment, servers (904A) comprise a plurality of front end web servers configured to serve responses to autonomous vehicles (902A-502E). The servers (904A) may additionally comprise one or more application servers configured to perform the operations discussed in the previous flow diagrams.

Central system (904) additionally includes a plurality of models (904B). In one embodiment, the models (904B) correspond to the delay models described previously. In some embodiments, models (904B) may additionally include vehicle models to profile the availability of vehicles during off periods.

Central system (904) additionally includes one or more databases (904C). The databases (904C) may include a database for vehicles (904D), packages (904E), and routing points (904F). In one embodiment, vehicles database (904D) stores a listing of autonomous vehicles including VINs, current locations, packages contained therein, and any other details relating to autonomous vehicles. In one embodiment, packages database (904E) includes details regarding packages including the current location of packages, the start points and destinations of packages, the results of security scans, and associations with vehicles. In one embodiment, routing points (904F) stores details regarding pickup devices and centralized delivery locations including coordinates, current package inventories, delay parameters, and other details discussed previously.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A non-transitory computer-readable storage medium for tangibly storing computer program instructions that, when executed by a computer processor, cause the computer processor to perform steps of:
receiving a request from an autonomous vehicle;
identifying, responsive to the request, a package stored within a delivery structure;
transmitting routing instructions to the autonomous vehicle, the routing instructions including a location of the delivery structure;
detecting a presence of the autonomous vehicle;
instructing the delivery structure to deposit the package into the autonomous vehicle;
calculating a waypoint for delivery of the package; and
transmitting transport routing instructions to the autonomous vehicle, the transport routing instructions including the waypoint.

2. The non-transitory computer-readable storage medium of claim 1, wherein instructing the delivery structure to deposit the package into the autonomous vehicle comprises instructing the delivery structure to insert the package into a bomb-proof and chemical-proof receptacle of the autonomous vehicle.

3. The non-transitory computer-readable storage medium of claim 1, wherein the computer program instructions further define a step of identifying the package based on a maximum distance or maximum time deviation from an existing route of the autonomous vehicle.

4. The non-transitory computer-readable storage medium of claim 1, wherein the computer program instructions further define a step of instructing the delivery structure to open a receptacle of the autonomous vehicle prior to depositing the package.

5. The non-transitory computer-readable storage medium of claim 1, wherein the computer program instructions further define a step of calculating the waypoint by calculating a predicted delay in reaching the waypoint and discarding the waypoint when the predicted delay exceeds a predetermined threshold.

6. The non-transitory computer-readable storage medium of claim 1, wherein the computer program instructions further define a step of calculating the waypoint by calculating a plurality of routes between a start point and a destination of the package, and selecting an optimal path, the optimal path including the waypoint.

7. The non-transitory computer-readable storage medium of claim 1, wherein the computer program instructions further define a step of coordinating a delivery of the package at the waypoint and identifying a secondary autonomous vehicle to pick up the package at the waypoint.

8. A method comprising:
receiving a request from an autonomous vehicle;
identifying, responsive to the request, a package stored within a delivery structure;
transmitting routing instructions to the autonomous vehicle, the routing instructions including a location of the delivery structure;
detecting a presence of the autonomous vehicle;
instructing the delivery structure to deposit the package into the autonomous vehicle;
calculating a waypoint for delivery of the package; and
transmitting transport routing instructions to the autonomous vehicle, the transport routing instructions including the waypoint.

9. The method of claim 8, wherein instructing the delivery structure to deposit the package into the autonomous vehicle comprises instructing the delivery structure to insert the package into a bomb-proof and chemical-proof receptacle of the autonomous vehicle.

10. The method of claim 8, further comprising identifying the package based on a maximum distance or maximum time deviation from an existing route of the autonomous vehicle.

11. The method of claim 8, further comprising instructing the delivery structure configured to open a receptacle of the autonomous vehicle prior to depositing the package.

12. The method of claim 8, further comprising calculating the waypoint by calculating a predicted delay in reaching the waypoint and discarding the waypoint when the predicted delay exceeds a predetermined threshold.

13. The method of claim 8, further comprising calculating the waypoint by calculating a plurality of routes between a start point and a destination of the package, and selecting an optimal path, the optimal path including the waypoint.

14. The method of claim 8, further comprising coordinating a delivery of the package at the waypoint and identifying a secondary autonomous vehicle to pick up the package at the waypoint.

15. A device comprising:
a processor; and
a storage medium for storing thereon program logic for execution by the processor, the program logic defining steps of:
receiving a request from an autonomous vehicle;
identifying, responsive to the request, a package stored within a delivery structure;
transmitting routing instructions to the autonomous vehicle, the routing instructions including a location of the delivery structure;
detecting a presence of the autonomous vehicle;
instructing the delivery structure to deposit the package into the autonomous vehicle;
calculating a waypoint for delivery of the package; and
transmitting transport routing instructions to the autonomous vehicle, the transport routing instructions including the waypoint.

16. The device of claim 15, wherein the program logic further defines a step of identifying the package based on a maximum distance or maximum time deviation from an existing route of the autonomous vehicle.

17. The device of claim 15, wherein the program logic further defines a step of instructing the delivery structure configured to open a receptacle of the autonomous vehicle prior to depositing the package.

18. The device of claim 15, wherein the program logic further defines a step of calculating the waypoint by calculating a predicted delay in reaching the waypoint and discarding the waypoint when the predicted delay exceeds a predetermined threshold.

19. The device of claim 15, wherein the program logic further defines a step of calculating the waypoint by calculating a plurality of routes between a start point and a destination of the package, and selecting an optimal path, the optimal path including the waypoint.

20. The device of claim 15, wherein the program logic further defines a step of coordinating a delivery of the package at the waypoint and identifying a secondary autonomous vehicle to pick up the package at the waypoint.

* * * * *